(12) United States Patent
Zahlen et al.

(10) Patent No.: US 11,241,708 B2
(45) Date of Patent: Feb. 8, 2022

(54) DEVICE FOR LACQUER TRANSFER

(71) Applicants: Airbus Operations GmbH, Hamburg (DE); Airbus (S.A.S.), Blagnac (FR)

(72) Inventors: Pierre C. Zahlen, Hamburg (DE); Christian Schepp, Königsbrunn (DE); Daniel Kress, Augsburg (DE); Waldemar Kümmel, Maisach (DE)

(73) Assignees: Airbus Operations GmbH, Hamburg (DE); Airbus (S.A.S.), Blagnac (FR)

( * ) Notice: Subject to any disclaimer, the term of this patent is extended or adjusted under 35 U.S.C. 154(b) by 0 days.

(21) Appl. No.: 16/844,132

(22) Filed: Apr. 9, 2020

(65) Prior Publication Data

US 2020/0324310 A1 Oct. 15, 2020

(30) Foreign Application Priority Data

Apr. 12, 2019 (DE) ...................... 10 2019 109 790.8

(51) Int. Cl.
*B05C 1/08* (2006.01)
*B05C 9/12* (2006.01)
(Continued)

(52) U.S. Cl.
CPC ............ *B05C 1/0808* (2013.01); *B05C 1/027* (2013.01); *B05C 1/0813* (2013.01); *B05C 9/12* (2013.01);
(Continued)

(58) Field of Classification Search
CPC ....... B05C 1/0808; B05C 1/0813; B05C 9/12; B05C 21/005; B05C 1/027; B05D 3/067;
(Continued)

(56) References Cited

U.S. PATENT DOCUMENTS 5,425,848 A 6/1995 Haisma et al.
6,174,567 B1 1/2001 Ueberschär et al.
(Continued)

FOREIGN PATENT DOCUMENTS

CN 102 463 293 A 5/2012
DE 10 84 469 B 6/1960
(Continued)

OTHER PUBLICATIONS

European Search Report for Application No. 20164755.9 dated Sep. 15, 2020.
(Continued)

*Primary Examiner* — Laura Edwards
(74) *Attorney, Agent, or Firm* — Jenkins, Wilson, Taylor & Hunt, P.A.

(57) ABSTRACT

A device for lacquer transfer includes a frame, transfer roller with circumferential lateral wall, nozzle for dispensing lacquer, and hardening unit, the hardening unit formed as a UV-light unit for hardening the lacquer in a contactless way by emitting UV-light, and is within an interior space defined by the transfer roller. The lateral wall of the transfer roller is transparent for UV-light, and the hardening unit is arranged such that UV-light is emitted towards the work surface upon which the lateral wall of the transfer roller rolls, to harden the lacquer after it being transferred to the work surface. Using the device, lacquer transfer can occur from the transfer roller to the work surface more reliably. The device includes a light shield between the hardening unit and outside contact surface with at least a portion of the outside contact surface provided with lacquer is shielded from UV-light emitted from the hardening unit.

8 Claims, 3 Drawing Sheets

(51) Int. Cl.
  *B05C 1/02* (2006.01)
  *B29C 35/08* (2006.01)
  *B05D 3/06* (2006.01)

(52) U.S. Cl.
  CPC ...... *B05D 3/067* (2013.01); *B29C 2035/0827* (2013.01)

(58) Field of Classification Search
  CPC ....... B05D 1/28; B29C 35/0888; B29C 35/10; B29C 2035/0827; B29C 59/046
  USPC ...... 118/244, 256, 259, 261, 262, 304, 50.1, 118/620
  See application file for complete search history.

(56) References Cited

U.S. PATENT DOCUMENTS

| | | | |
|---|---|---|---|
| 6,344,088 | B1 | 2/2002 | Kamkihara et al. |
| 6,554,900 | B1 | 4/2003 | Aydin et al. |
| 6,627,262 | B1 | 9/2003 | Soas et al. |
| 9,808,823 | B2 | 11/2017 | Pagendarm et al. |
| 10,173,238 | B2 | 1/2019 | Sturm et al. |
| 10,335,824 | B2 | 7/2019 | Mueller |
| 2001/0032585 | A1* | 10/2001 | Koehn ................. B05C 1/0808 118/304 |
| 2002/0108635 | A1 | 8/2002 | Marrero |
| 2005/0061655 | A1 | 3/2005 | Gros et al. |
| 2006/0066703 | A1 | 3/2006 | Kadomatsu et al. |
| 2010/0080958 | A1 | 4/2010 | Goelling |
| 2010/0233354 | A1 | 9/2010 | Barral et al. |
| 2012/0148727 | A1 | 6/2012 | Heo et al. |
| 2012/0313274 | A1 | 12/2012 | Loukusa et al. |
| 2013/0341497 | A1 | 12/2013 | Zuardy et al. |
| 2014/0305583 | A1 | 10/2014 | Casset |
| 2015/0064389 | A1 | 3/2015 | Zahlen et al. |
| 2015/0251409 | A1 | 9/2015 | Ohnishi |
| 2015/0273762 | A1 | 10/2015 | Okamoto |
| 2017/0080454 | A1 | 3/2017 | Hidaka et al. |
| 2017/0095831 | A1 | 4/2017 | Sturm et al. |
| 2017/0266691 | A1 | 9/2017 | Travis |
| 2018/0281297 | A1 | 10/2018 | Pringle et al. |
| 2020/0306785 | A1 | 10/2020 | Zahlen et al. |
| 2020/0306786 | A1 | 10/2020 | Zahlen et al. |
| 2020/0306787 | A1 | 10/2020 | Zahlen et al. |
| 2020/0306791 | A1 | 10/2020 | Zahlen et al. |
| 2020/0324315 | A1 | 10/2020 | Zahlen et al. |
| 2020/0353498 | A1 | 11/2020 | Kerger et al. |

FOREIGN PATENT DOCUMENTS

| | | |
|---|---|---|
| DE | 34 19 867 C1 | 9/1985 |
| DE | 37 21 593 A1 | 1/1989 |
| DE | 694 05 451 T2 | 3/1998 |
| DE | 699 10 430 T2 | 3/2004 |
| DE | 699 24 956 T2 | 9/2005 |
| DE | 20 2006 003 265 U1 | 6/2006 |
| DE | 10 2014 104 340 A1 | 10/2015 |
| DE | 10 2014 015 622 A1 | 4/2016 |
| DE | 20 2016 101 299 U1 | 6/2017 |
| DE | 10 2016 224 592 A1 | 6/2018 |
| EP | 0 408 283 A2 | 1/1991 |
| EP | 1 034 905 A2 | 9/2000 |
| EP | 1 117 488 B1 | 5/2004 |
| EP | 2 021 180 B1 | 11/2011 |
| EP | 3 248 692 A1 | 11/2017 |
| EP | 3 263 447 A1 | 1/2018 |
| EP | 2 632 605 B1 | 5/2019 |
| EP | 3 722 007 A1 | 10/2020 |
| EP | 3 722 009 A1 | 10/2020 |
| EP | 3 725 422 A1 | 10/2020 |
| EP | 3 725 539 A1 | 10/2020 |
| EP | 3 733 300 A1 | 11/2020 |
| EP | 3 750 637 A1 | 12/2020 |
| GB | 1 555 771 A | 11/1979 |
| JP | S 60250936 A | 12/1985 |
| JP | S63274748 A | 11/1988 |
| JP | 2005-034740 A | 2/2005 |
| JP | 2006-026558 A | 2/2006 |
| JP | 2008-086882 A | 4/2008 |
| KR | 2001/0093377 A | 10/2001 |
| TW | 2011 03647 A | 2/2011 |
| WO | WO 89/11343 A2 | 11/1989 |
| WO | WO 99/60210 A1 | 11/1999 |
| WO | WO 02/026399 A1 | 4/2002 |
| WO | WO 2010/146998 A1 | 12/2010 |
| WO | WO 2015/064685 A1 | 5/2015 |
| WO | WO 2015/155128 A1 | 10/2015 |
| WO | WO 2018/150190 A1 | 8/2018 |

OTHER PUBLICATIONS

European Search Report for Application No. 20164573.6 dated Sep. 15, 2020.
European Search Report for Application No. 20164756.7 dated Sep. 21, 2020.
European Search Report for Application No. 20168066.7 dated Sep. 22, 2020.
European Search Report for Application No. 20166215.2 dated Sep. 7, 2020.
European Search Report for Application No. 20164300.4 dated Sep. 29, 2020.
Non-Final Office Action for U.S. Appl. No. 16/829,898 dated Jun. 9, 2021.
Non-Final Office Action for U.S. Appl. No. 16/829,914 dated Jul. 21, 2021.
Non-Final Office Action for U.S. Appl. No. 16/829,925 dated Sep. 1, 2021.
Restriction Requirement for U.S. Appl. No. 16/843,112 dated Sep. 8, 2021.
Final Office Action for U.S. Appl. No. 16/829,914 dated Nov. 9, 2021.
Notice of Allowance for U.S. Appl. No. 16/829,898 dated Nov. 19, 2021.

* cited by examiner

DEVICE FOR LACQUER TRANSFER

CROSS-REFERENCE TO RELATED APPLICATION

This application claims priority to German Patent Application No. 10 2019 109 790.8 filed Apr. 12, 2019, the entire disclosure of which is incorporated by reference herein.

TECHNICAL FIELD

The disclosure herein relates to a device for lacquer transfer to a work surface, in particular to an aerodynamic surface of an aircraft, such as an outer surface of a wing.

BACKGROUND

The device comprises a frame, a transfer roller with a circumferential lateral wall, a nozzle preferably in the form of a slit nozzle with a muzzle end for dispensing lacquer, and a hardening unit. The nozzle and the hardening unit are each at least indirectly connected to the frame. An outside contact surface of the lateral wall comprises several depressions. The transfer roller is mounted rotatably about an axis of rotation at the frame. The nozzle is arranged contactless to or in direct contact with the outside contact surface of the lateral wall for dispensing lacquer into respective depressions in the lateral wall while the transfer roller is rotated about the axis of rotation. The transfer roller is configured to roll with the outside contact surface on a work surface of a work piece for transferring the lacquer from the depressions to the work surface of the work piece. The hardening unit is formed as a UV-light unit configured for hardening the lacquer in a contactless way by emitting UV-light. UV-light within the meaning of the disclosure herein is any kind of UV-radiation. The hardening unit is arranged within an interior space defined by or formed within the transfer roller. The lateral wall of the transfer roller is transparent for UV-light. The hardening unit is arranged such that UV-light is emitted towards the work surface upon which the lateral wall of the transfer roller rolls, to harden the lacquer preferably immediately after it being transferred to the work surface.

A similar device for lacquer transfer is known from WO 2015/155 128 A1.

With known devices for lacquer transfer it might occur that lacquer is unintentionally prehardened at an early stage at the transfer roller by scattered, indirect UV-light, so that parts of the lacquer adhere to the transfer roller instead of being transferred to the work surface.

SUMMARY

Therefore, an object of the disclosure herein is to provide a device by which lacquer transfer from the transfer roller to the work surface can be carried out more reliably.

This object is achieved by a device as disclosed herein. Specifically, the object is achieved in that the device comprises a light shield arranged between the hardening unit and the outside contact surface, such that at least a portion of the outside contact surface provided with lacquer, i.e. a portion of the contact surface upstream from a transfer area in which the lacquer is transferred to the work surface, is shielded from UV-light emitted from the hardening unit. In such a way, only the transfer area where hardening of the lacquer is intended is exposed to UV-light and an early stage prehardening of lacquer at the transfer roller upstream from the intended transfer area can be avoided, thereby allowing a more complete and reliable lacquer transfer.

Preferably, the device or at least its frame is configured to be releasably connected to a handling device, such as a robot with a robot arm. The frame may be configured to be releasably connected to the robot arm. Thus, the device may be a mobile device, in particular a mobile mechanical device.

The frame may form the bases of the device, since the slit nozzle and the hardening unit are each at least indirectly connected to the frame. For this purpose, the device may comprise further a connector(s) for connecting the slit nozzle to the frame and/or further connector(s) for connecting the hardening unit to the frame. Thus, the slit nozzle and the hardening unit may be mounted to the frame. The slit nozzle may be releasably connected to the frame. Thus, the slit nozzle may be disconnected form the frame, in particular for a maintenance purpose. The slit nozzle may be connected to the frame, such that the slit nozzle can be releasably locked in a working position. If this lock is released, the slit nozzle may be pivoted via a hinge, which holds the slit nozzle at the frame. Thus, the slit nozzle may then be subject to a maintenance procedure.

The transfer roller is mounted rotatably to the frame. The transfer roller can therefore rotate about the axis of rotation. For this purpose, the device may comprise a drive unit, which is configured to drive the transfer roller in a rotation direction of the transfer roller about the axis of rotation. The drive unit may also be at least indirectly connected or mounted to the frame. During use, the drive unit drives the transfer roller, such that the transfer roller rotates about the axis of rotation and roles with the contact surface on a work surface. Furthermore, the device is moved translational in parallel to the work surface, preferably by a robot arm or another handling device, while the transfer roller rotates, such that the transfer roller rolls on the work surface for transferring lacquer.

The slit nozzle may be connected via a pipe or a tube to a lacquer supply unit, which may be configured to supply the lacquer via the tube or the pipe to the slit nozzle. The lacquer can be hardened via UV-light. The lacquer supplied to the slit nozzle may be a liquid medium or a viscous medium.

According a first nozzle arrangement of the slit nozzle, the muzzle end of the slit nozzle may be arranged contactless to the outside contact surface of the lateral wall for dispensing lacquer into respective depressions.

According to an alternative second nozzle arrangement of the slit nozzle, the muzzle end of the slit nozzle is arranged in direct contact with the outside contact surface of the lateral wall for dispensing lacquer into respective depressions.

If reference is subsequently made to the slit nozzle without explicitly specifying the first or second nozzle arrangement, the corresponding explanations may, in principle, apply as preferred embodiments to each of the two arrangements. Therefore, it may be possible to apply the respective explanations to one of the first and second nozzle arrangement or to both nozzle arrangements.

The slit nozzle is configured for dispensing lacquer into the depressions of the lateral wall of the transfer roller. The slit nozzle may also be configured for dispensing lacquer onto depression-free sections of the lateral wall of the transfer roller. Thus, the slit nozzle may be configured for dispensing a lacquer film onto the lateral wall of the transfer roller, wherein the lacquer of the lacquer film fills the depressions and the lacquer film extends in axial direction and partly in circumferential direction of the transfer roller.

The lacquer film may therefore theoretically divide into a depression part, which fills the depressions, and a remaining part, which is also referred to as bulk or a bulk part. Therefore, the transfer roller may be configured to roll with the contact surface of the transfer roller on a work surface of a work piece for transferring the lacquer from the contact surface to the work surface of the work piece, such that the lacquer film is transferred to the work surface. This encompassed the transfer of the lacquer from the depressions, but also the transfer of the bulk part. If the transfer of the lacquer from the depressions to the work surface, in particular to a surface of a wing, is described in the following, this shall preferable not exclude the possible transfer of the bulk part to the respective surface and/or the possible transfer of the lacquer from the depressions via the lacquer film.

Resulting from the direct contact between the muzzle end of the slit nozzle and the outside surface of the lateral wall of the transfer roller, preferably if the slit nozzle is in the second nozzle arrangement, a desired fill level of the depressions may be ensured and/or a desired mean thickness of the lacquer film may be ensured. However, a resulting contact force and/or a resulting contact friction should not change as much as possible during a rotation of the transfer roller in order to prevent a slip-stick-effect.

But a desired fill level of the depression may also be ensured and/or a desired mean thickness of the lacquer film on the outside surface of the lateral wall may be ensured, if the muzzle end of the slit nozzle is arranged contactless to the outside contact surface of the lateral wall, in particular, if the slit nozzle is arranged according to the first nozzle arrangement. A distance formed by the gap between the slit nozzle and the outside contact surface at the second deformation section may be predefined by an arrangement of the slit nozzle according to the second nozzle arrangement, such that lacquer dispensed by the slit nozzle continuously forms the lacquer film on the on the outside surface of the lateral wall, preferably with a predefined thickness. The dispensed lacquer therefore fills the aforementioned gap with the lacquer. As an effect, lacquer also fills the depressions of the outside contact surface at the second deformation section of the lateral wall. As a further effect, a bulk part may also be applied to the outside contact surface at the second deformation section of the lateral wall.

According to a preferred embodiment, the light shield comprises a shield opening, preferably elongate and in parallel to the axis of rotation, for letting through UV-light emitted from the hardening unit. Preferably, the shield opening is arranged opposite, in particular above a transfer area in which the lacquer is transferred to the work surface. The shield opening defines the angle or area in which UV-light emitted from the hardening unit is directly let through to the lacquer on the outside contact surface of the transfer roller and on the work surface respectively.

According to a further preferred embodiment, the light shield has a shape of a cylinder shell segment preferably having a circular cross section interrupted by the shield opening. By such a shape the light shield circumferentially covers the entire angular range around the hardening unit, accept from the shield opening. The cylindrical shape is particularly advantageous as it fits to the shape of the transfer roller and can be arranged close to or adapted to the outer contact surface.

According to another preferred embodiment, the light shield is arranged proximate the lateral wall, preferably opposite an inner surface of the lateral wall. In such a way, the amount of scattered light reaching the lacquer at areas outside the transfer area can be widely reduced.

According to yet another preferred embodiment, the transfer roller is formed as a tire having a circular, preferably torus-shaped pressure chamber between the lateral wall and an inner wall directed to the interior space. Similar as the lateral wall the inner wall is transparent for UV-light, so that UV-light emitted from the hardening unit inside the interior space can shine through the entire transfer roller to harden the lacquer on the outside contact surface. The pressure chamber is preferably inflated with pressurized air and at least the lateral wall is formed elastically to be able to adapt the outer contact surface in contact with the work surface depending on the air pressure in the pressure chamber, and thus to adapt the angular range of the transfer area along the work surface. Preferably, the light shield is arranged inside the pressure chamber between the lateral wall and the inner wall. In such a way, the light shield can be arranged near and opposite the lateral wall.

In particular, it is preferred that the light shield is held in position inside the rotating transfer roller by magnetic force, preferably in a static angular position about the axis of rotation with the shield opening opposite the transfer area. The magnetic force allows to hold the light shield in a contactless manner, so that the light shield can be held in a static angular position from outside the transfer roller while the transfer roller, in the atmospherically sealed pressure chamber of which the light shield is arranged, rotates.

It is further preferred that a magnet, in particular an electromagnet or a permanent magnet, is mounted directly or indirectly to the frame, while a magnetic element is mounted to or part of the light shield in a position opposite the magnet, such that the magnetic force acts between the magnet and the magnetic element, preferably attracts the magnetic element to the magnet. In such a way, a simple magnetic coupling between the frame and the light shield is provided.

It is also preferred that the light shield is rotatably supported inside the transfer roller by a roller bearing. In such a way, the light shield can rotate relative to the transfer roller about the axis of rotation and at the same time is supported in a radial direction by the transfer roller.

In particular, it is preferred that the roller bearing comprises a plurality of rollers supporting the light shield against the inner wall. The rollers preferably have axes of rotation in parallel to the axis or rotation of the transfer roller. In such a way, the light shield is supported in radial direction by the inner wall.

Further features, advantages and application possibilities of the disclosure herein may be derived from the following description of exemplary embodiments and/or the figures. Thereby, all described and/or visually depicted features for themselves and/or in any combination may form an advantageous subject matter and/or features of the disclosure herein independent of their combination in the individual claims or their dependencies. Furthermore, in the figures, same reference signs may indicate same or similar objects.

DETAILED DESCRIPTION

Figure 1:
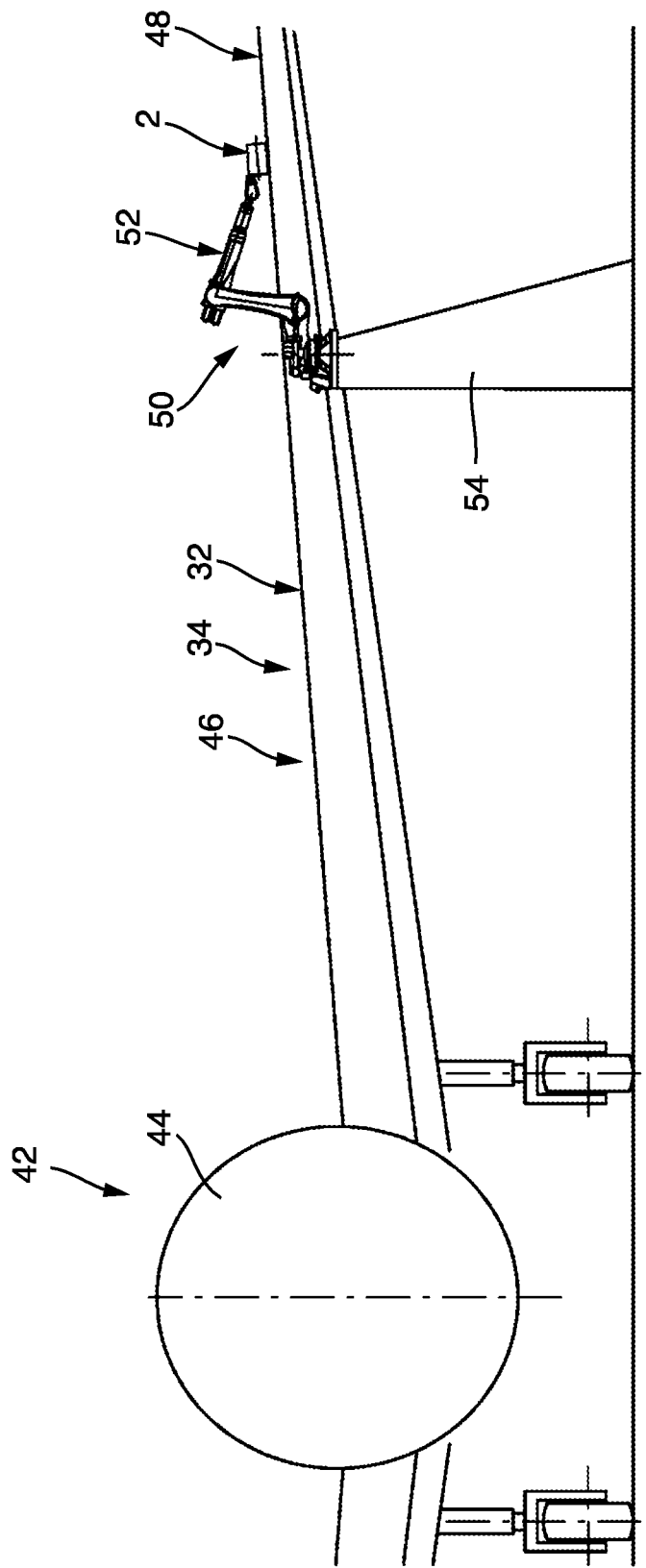
FIG. 1 schematically illustrates a part of an aircraft wherein a device arranged for transferring lacquer on an upper wing surface.

FIG. 1 schematically illustrates an aircraft 42, which comprises a fuselage 44 and a wing 46. The air resistance of the aircraft 42 can be reduced, if the upper wing surface 48 of the wing 46 comprises a profile structure. It has been found of advantage, if this profile structure is a microstructure.

FIG. 1 also schematically shows a robot 50, which is seated on a rack 54. The robot 50 comprises a movable robot arm 52. A device 2 is mounted at an end of the robot arm 52, such that the device 2 can be moved by the robot 50.

The device 2 is configured for transferring a lacquer onto a work surface 32 of a workpiece 34. According to the example shown in FIG. 1, the workpiece 34 can be formed by the wing 46 of the aircraft 42. Thus, the upper wing surface 48 can form the work surface 32.

Figure 2:
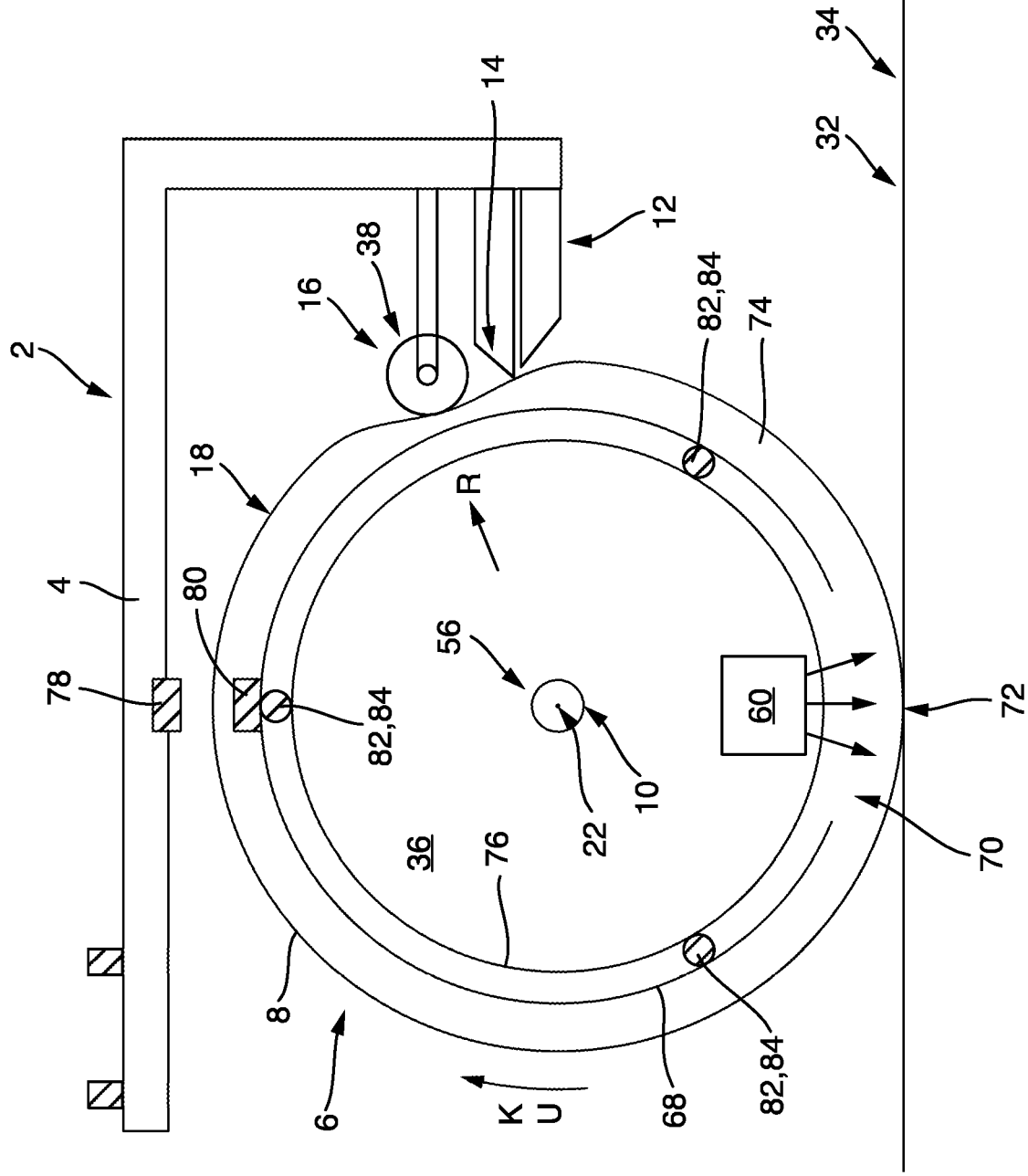
FIG. 2 schematically illustrates an embodiment of the device in a cross-sectional view.

A first embodiment of the device 2 is schematically illustrated in FIG. 2 in a cross-sectional view. The device 2 comprises a frame 4, a transfer roller 6 with a circumferential lateral wall 8, a drive unit 10, a slit nozzle 12 with a muzzle end 14 for dispensing lacquer, and a deformation unit 16. The transfer roller 6 may also be referred to as a transfer tire. The device 2 can be attached via the frame 4 to the robot arm 52. However, instead of a robot 50 any other handling device may also be used, which is configured to move the device 2 in space. The frame 4 may be adapted to be releasably connected to a handling device, such as the robot 50.

Figure 3:
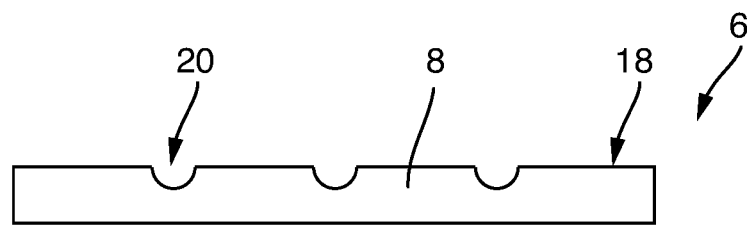
FIG. 3 schematically illustrates a part of the lateral wall of the transfer roller in a cross-sectional view.
Figure 4:
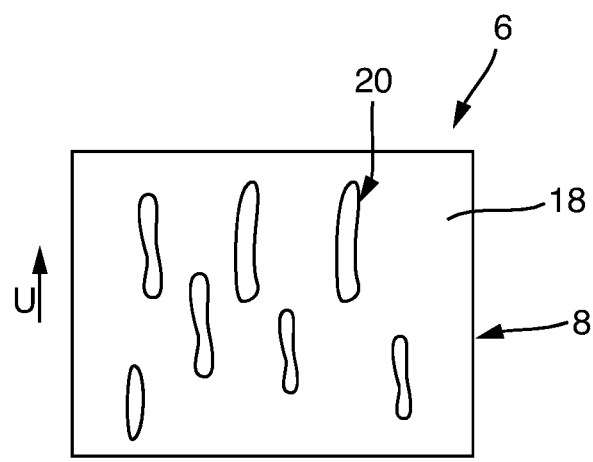
FIG. 4 schematically illustrates a further embodiment of the lateral wall of the transfer roller in a top view.

The transfer roller 6 is mounted rotatably, in particular by at least one bearing, about an axis of rotation 22 at the frame 4. An outside contact surface 8 of the lateral wall 6 comprises several depressions 20. The depressions 20 may be evenly or stochastically distributed about the circumference of the lateral wall 6. FIGS. 3 and 4 show a part of the transfer roller 6 in a cross-section view and a top view, respectively.

As schematically indicated in FIG. 3, the depressions 20 can be formed by recesses arranged at the outside surface 18 of the lateral wall 8 of the transfer roller 6. The depressions 20 can have a predefined size and/or structure. A mean structure size of the depressions 20 can be in the range of 0.1 micrometer to 100 micrometer. In other words, each of the depressions 20 may have a microstructure.

FIG. 4 as an example shows the depressions 20 of a part of the lateral wall 8 of the transfer roller 6 in a top view. Each of the depressions 20 may comprise an elongated extension in a circumferential direction U of the lateral wall 8 of the transfer roller 6.

Each of the depressions 20 is configured to receive lacquer and to transfer this received lacquer to a work surface 32 of a work piece 34, such as the upper wing surface 48 of a wing 26. Therefore, the several depressions 20 at the outside contact surface 18 of the lateral wall 8 may be arranged and/or formed according to a predefined structure, in particular a microstructure. The lateral wall 8 is preferably made of silicone, such that a damage of the wing surface 48 can be prevented.

If the depressions 20 are filled with a lacquer and if the outside contact surface 18 comes into contact with the work surface 32, in particular the upper wing surface 48, the lacquer previously received in the depressions 20 is transferred to the work surface 32, in particular the upper outside surface 48 of the aircraft 42. This transferred lacquer has a structure, in particular microstructure, corresponding to a structure defined by depressions 20. Thus, the outside contact surface 18 with its depressions 20 is configured for embossing a lacquer-structure, in particular a lacquer-microstructure, on the work surface 32, in particular the upper wing surface 48.

As schematically illustrated in FIG. 2, the slit nozzle 12 is directly or indirectly connected to the frame 4. Thus, the slit nozzle 12 may be mounted to the frame 4. Furthermore, the deformation unit 16 is directly or indirectly connected to the frame 4. For instance, the deformation unit 16 may be mounted on the frame 4. According to an example not illustrated in FIG. 2, the slit nozzle 12 and the deformation unit 16 may be formed by an integrated unit. But the slit nozzle 12 may also be directly connected to the deformation unit 16, or vice versa. Thus, the slit nozzle 12 and the deformation unit 16 may be mounted in series to the frame 4.

The device 2 also comprises the drive unit 10. The drive unit 10 is configured to drive the transfer roller 6 in a rotation direction K about the axis of rotation 22.

The lateral wall 8 of the transfer roller 6 is elastically deformable in a radial direction R of the transfer roller 6. The lateral wall 8 of the transfer roller 6 can be made of an elastomer plastic, a silicone or any other elastically deformable plastic material. Preferably, the lateral wall 8 of the transfer roller 6 is made of a synthetic, elastically deformable silicone. As a result, the lateral wall 8 can be at least section-wise deformed in positive or negative radial direction R. The deformation unit 16 is configured to deform the lateral wall 8 in the radial direction R of the transfer roller 6 upstream from the slit nozzle 12 to provide a stable distance of the lateral wall 8 to the muzzle end 14 of the slit nozzle 12 for a defined application of lacquer to the outside contact surface 18 of the lateral wall 8. If references made to the radial direction R, this may refer to the positive radial direction R or an opposite negative radial direction.

The device 2 further comprises a hardening unit 60. The hardening unit 60 is configured for hardening the lacquer in a contactless way. The hardening unit 60 is formed by an UV-light unit. The hardening unit 60 is directly or indirectly connected to the frame 4. Moreover, the hardening unit 60 is arranged within the interior space 36 formed by the transfer roller 6. The lateral wall 8 of the transfer roller 6 is configured to transmit UV-light-waves. Thus, the lateral wall 8 is transparent for UV-light. The hardening unit 60 is arranged, such that UV-light is emitted towards the work surface 32 upon which the lateral wall 8 of the transfer roller 6 rolls. The lacquer is hardenable via UV-light. Therefore, the device is configured to control the drive unit 10 and/or the hardening unit 60 such that lacquer transferred to the work surface 32 is immediately hardened via UV-light emitted by the hardening unit 60.

As shown in FIG. 2, the device 2 comprises a light shield 68 arranged between the hardening unit 60 and the outside contact surface 18, such that at least a portion of the outside contact surface 18 provided with lacquer, specifically a portion of the contact surface upstream from a transfer area 72 in which the lacquer is transferred to the work surface 32, is shielded from UV-light emitted from the hardening unit 60.

The light shield 68 comprises a shield opening 70 in parallel to the axis of rotation 22 for letting through UV-light emitted from the hardening unit 60. The shield opening 70 is arranged opposite the transfer area 72 in which the lacquer is transferred to the work surface 32. The light shield 68 has a shape of a cylinder shell segment with a circular cross section interrupted by the shield opening 70.

The transfer roller 6 is formed as a tire having a circular pressure chamber 74 inflated with pressurized air between the lateral wall 8 and an inner wall 76 directed to the interior space 36. Similar as the lateral wall 8 the inner wall 76 is transparent for UV-light. The light shield 68 is arranged inside the pressure chamber 74 between the lateral wall 8 and the inner wall 76 to be arranged proximate the lateral wall 8.

The light shield 68 is held in position inside the rotating transfer roller 6 with the shield opening 70 opposite the transfer area 72 by magnetic force, wherein a magnet 78 is mounted to the frame 4 and a corresponding magnetic element 80 is mounted to the light shield 68 in a position opposite the magnet 78, such that the magnetic force acts between the magnet 78 and the magnetic element 80 and attracts the magnetic element 80 to the magnet 78.

The light shield 68 is rotatably supported inside the transfer roller 6 by a roller bearing 82 comprising a plurality of rollers 84 supporting the light shield 68 against the inner wall 76.

It is additionally pointed out that "comprising" does not rule out other elements, and "a" or "an" does not rule out a multiplicity. It is also pointed out that features that have been described with reference to one of the above exemplary embodiments may also be disclosed as in combination with other features of other exemplary embodiments described above. Reference signs in the claims are not to be regarded as restrictive.

While at least one example embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for lacquer transfer, comprising:
a frame;
a transfer roller with a pressure chamber that is inflated to define a circular cross-section between a circumferential lateral wall and a circumferential inner wall and is mounted rotatably about an axis of rotation at the frame, wherein the lateral wall is transparent for UV-light and comprises an outside contact surface that comprises depressions;
a nozzle that is arranged contactless to, or in direct contact with, the outside contact surface for dispensing lacquer into respective ones of the depressions of the outside contact surface while the transfer roller is rotated about the axis of rotation;
a hardening unit comprising a UV-light unit, which is positioned within an interior space defined by the inner wall of the transfer roller and is configured for hardening the lacquer in a contactless way by emitting UV-light; and
a light shield positioned within the pressure chamber, between the lateral wall and the inner wall and also between the hardening unit and the outside contact surface, such that at least a portion of the outside contact surface provided with lacquer is shielded from UV-light emitted from the hardening unit;
wherein the nozzle and the hardening unit are each at least indirectly connected to the frame;
wherein the transfer roller is configured to roll with the outside contact surface on a work surface of a work piece for transferring the lacquer from the depressions to the work surface of the work piece; and
wherein the hardening unit is arranged such that UV-light is emitted towards the work surface upon which the lateral wall of the transfer roller rolls, to harden the lacquer after it is transferred to the work surface.

2. The device of claim 1, wherein the light shield comprises a shield opening for letting through UV-light emitted from the hardening unit, and
wherein the shield opening is opposite a transfer area in which the lacquer is transferred to the work surface.

3. The device of claim 2, wherein the light shield has a shape of a cylinder shell segment with a circular cross section interrupted by the shield opening.

4. The device of claim 1, wherein the light shield is proximate the lateral wall.

5. The device of claim 1, wherein the light shield is held in position inside the rotating transfer roller by magnetic force.

6. The device of claim 5, wherein a magnet is mounted to the frame, and wherein a magnetic element is mounted to or part of the light shield in a position opposite the magnet, such that the magnetic force acts between the magnet and the magnetic element.

7. The device of claim 1, wherein the light shield is rotatably supported inside the transfer roller by a roller bearing.

8. The device of claim 7, wherein the roller bearing comprises a plurality of rollers supporting the light shield against the inner wall.

* * * * *